June 29, 1943.    H. A. YOUNG ET AL    2,323,175
WEAR TESTING MACHINE
Filed Nov. 10, 1939    2 Sheets-Sheet 1
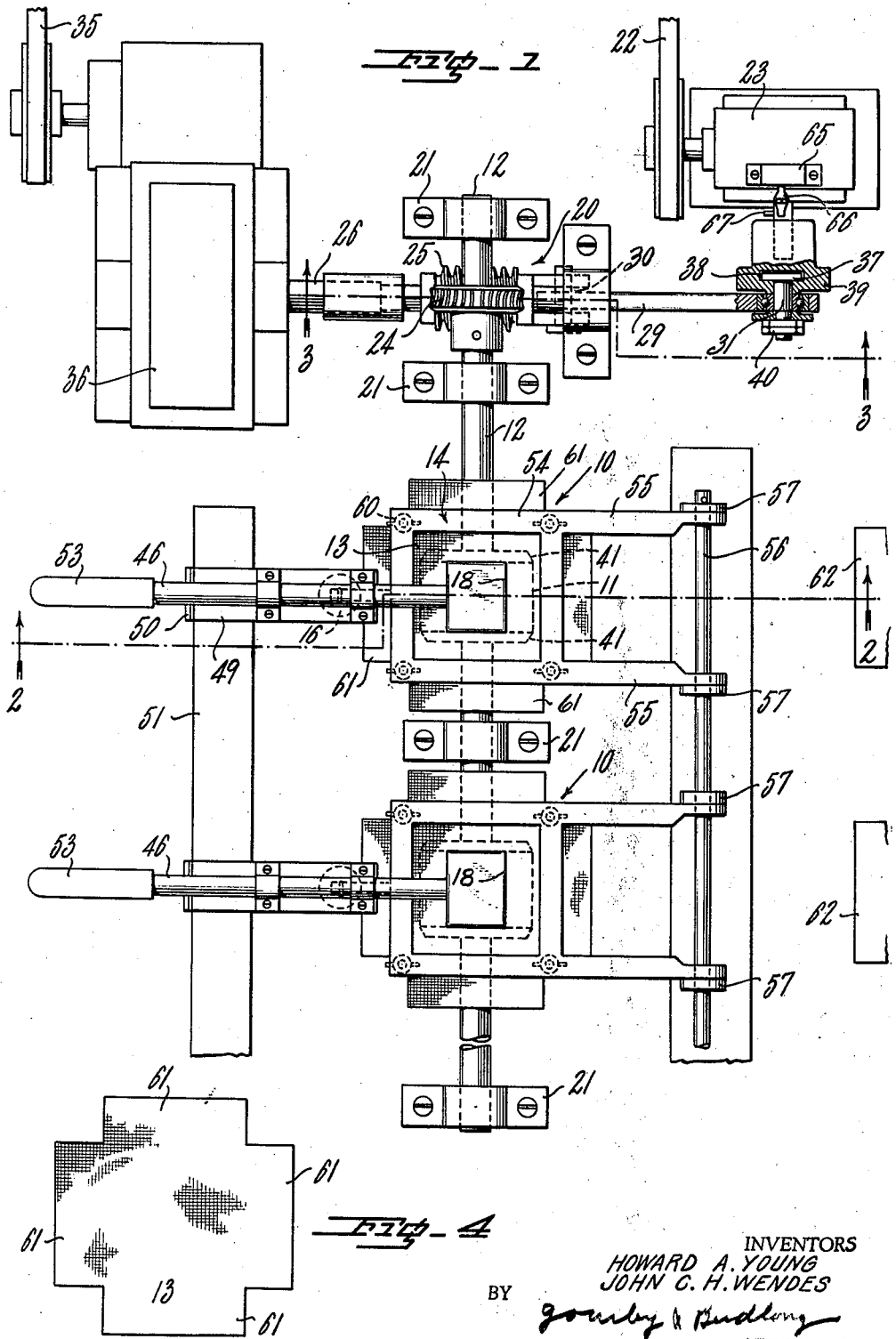
INVENTORS
HOWARD A. YOUNG
JOHN C. H. WENDES
BY
ATTORNEYS

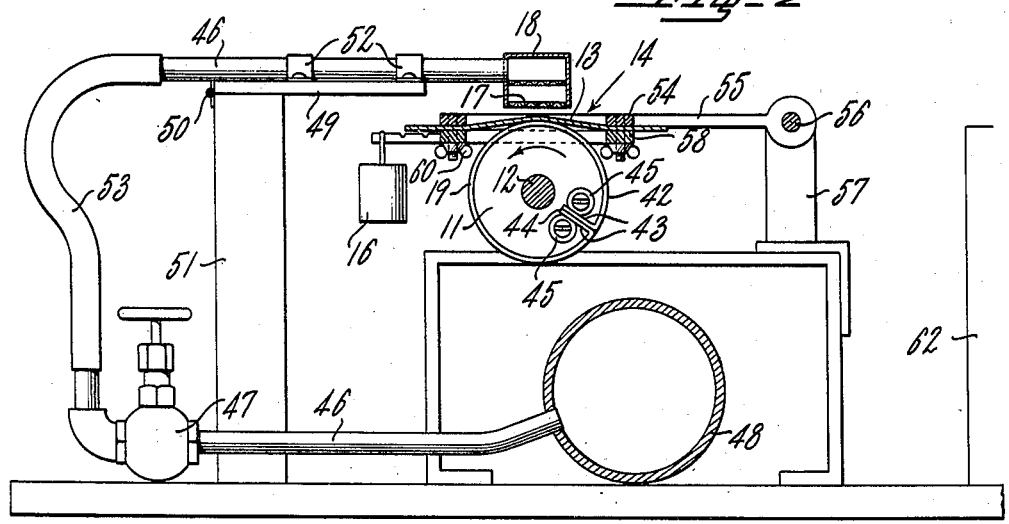
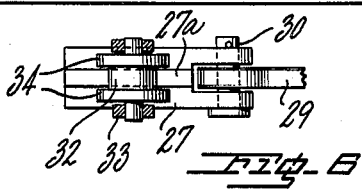
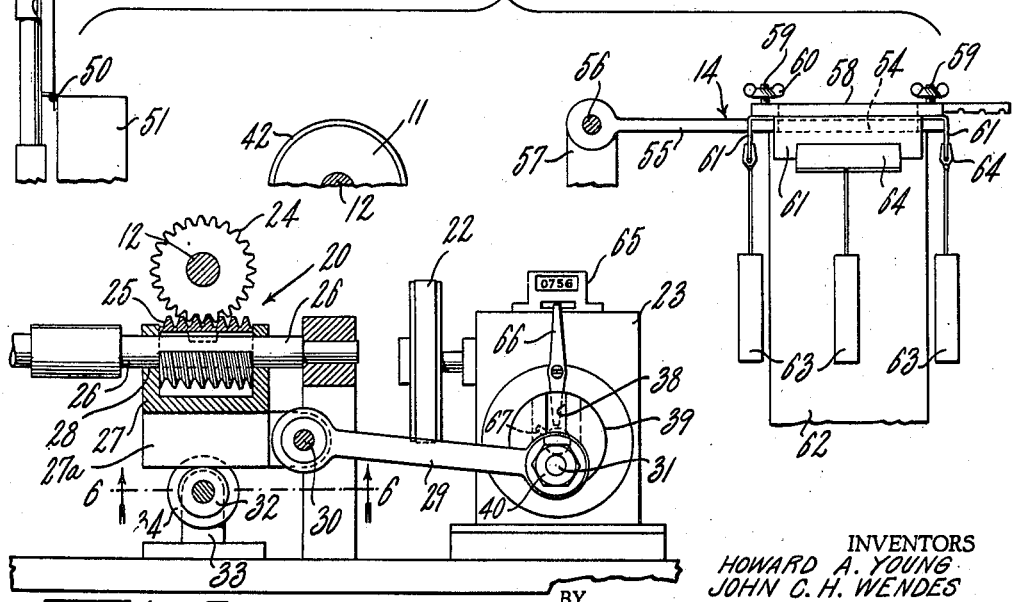

Patented June 29, 1943

2,323,175

UNITED STATES PATENT OFFICE 2,323,175

WEAR TESTING MACHINE

Howard A. Young, Westfield, N. J., and John C. H. Wendes, Naugatuck, Conn., assignors to United States Rubber Company, New York, N. Y., a corporation of New Jersey Application November 10, 1939, Serial No. 303,760

5 Claims. (Cl. 73—51)

This invention relates to a material wear testing machine which is particularly useful for testing textile fabrics and the like.

The actual conditions of wear to which textile materials may be subjected are so varied and the life of wear may be so long that it is not practical to duplicate all of such conditions to the end that the life of a given piece of material may be determined. Consequently in machines suitable for testing materials generally, no attempt is made to duplicate such actual conditions, and on the other hand a procedure is followed which will give a result which will indicate the wear value of a given material as compared to some other material. Of course the results of the test are most valuable when they are compared and analyzed in reference to a material having like characteristics such as in respect to the knit or weave, the size, and the number of threads per inch. In any case the results are of little value unless each test is an exact duplicate of the standard test.

Therefore it is among the objects of the present invention to reduce the time heretofore required to perform a given test, and to obtain dependable, consistent results which will accurately indicate the comparative wear value of a given piece of material, and to utilize a relatively small test piece for each test. Such objects are obtained by pressing the surface of a test piece of material against the abrasive surface of a wheel with a uniform predetermined pressure and oscillating the abrasive surface against the material. The abrasive surface is constantly changed and the loose particles worn from the rubbing surfaces are removed to insure constant results for each oscillation. The number of oscillations are counted by a mechanical counter and the results of the test are expressed in terms of the number of oscillations required to produce a certain amount of wear.

The above and other objects of this invention will be more clearly understood by referring to the following description and the accompanying drawings, in which:

Fig. 1 is a plan view of the material wear testing machine embodying this invention;

Figs. 2 and 3 are part elevational and sectional views of the machines taken on lines 2—2 and 3—3, respectively, of Fig. 1;

Fig. 4 is a plan view of a piece of material to be tested;

Fig. 5 is a view of the upper portion of the machine corresponding to that shown in Fig. 2, but showing the test piece holder moved into the position for inserting the test piece therein, and also showing in its inoperative position the box from which the air may be discharged or drawn into for the removal of loose particles abraded from the test piece; and Fig. 6 is a detail view of the oscillating mechanism taken on line 6—6 of Fig. 3 looking up in the direction of the arrows.

Referring to the drawings a plan view of a material wear testing machine is shown in Fig. 1. The machine is provided with a plurality of testing units 10 each having an abrasive wheel 11 fixed to a common shaft 12. Two such units 10 are illustrated in the drawings but any suitable number may be arranged along the shaft 12. As all of these units are alike only one will be described in detail.

The material to be tested, or test piece 13 is retained in a stretched condition in both a transverse and longitudinal direction by the holder 14 which holds the material 13 against the abrasive wheel 11 under a uniform pressure which may be applied by a weight 16 as shown in Fig. 2. Loose particles of material which may be worn from the abrasive wheel 11 and the material to be tested 13 are removed from these surfaces by air which may be blown from the opening 17 in the box 18 and through the fabric test piece 13 upon the abrasive wheel 11. Preferably the air is blown from the box 18, but the particles may be removed by producing a sub-atmospheric pressure in the line leading to the box 18 and drawing the air and particles into the box when an open weave textile fabric is being tested.

The abrasive wheels 11 are oscillated back and forth within a predetermined arc against the test piece 13 and the wheel is simultaneously advanced by rotation to constantly change the abrasive surface 19 coming in contact with the test piece 13. Such motions are transmitted to the abrasive wheels 11 by means of a mechanism 20 (Figs. 1 and 3) which drives the end of the shaft 12 mounted in bearings 21.

The oscillating and rotating mechanism 20 is best shown in Fig. 3, and as shown therein the oscillating mechanism is driven from a belt 22 which drives a gear mechanism 23. The mechanism 20 comprises a worm wheel 24 which is fixed to the shaft 12 and meshes with a worm 25. The worm 25 is slidably keyed to a shaft 26, and it may be reciprocated back and forth on the shaft by a yoke 27 within which the worm 25 is mounted. The yoke 27 is also slidably supported on the shaft 26 which passes through bores 28 in each branch of the yoke. The yoke 27 is reciprocated by a pitman rod 29 which is pivoted at one end to a pin 30 on the yoke 27 and at the other end to an eccentric pin 31 driven by the gear mechanism 23. The bottom of the yoke 27 is supported on a roller 32 which is mounted in a bracket 33. As the yoke 27 is reciprocated it is guided by the flanges 34 on the roller 32 which engage a ridge 27a on the yoke 27, and the worm 25 is caused to reciprocate back and forth on the shaft 26. The worm 25 acts as a rack and causes the worm wheel 24 to oscillate back and forth and thereby transmit such oscillatory motion to abrasive wheels 11 mounted on the shaft 12.

While the shaft 12 is being oscillated by the belt and pulley drive 22, it is also caused to rotate slowly and continuously in one direction by the belt and pulley drive 35 (Fig. 1), so as to constantly change the abrasive surface 19 of the wheels 11 coming in contact with the test piece 13. The belt 35 drives the gear mechanism 36 which in turn drives the shaft 26 and causes it to rotate the worm 25, which is slidably keyed thereto. The worm 25 transmits such rotary motion to the worm wheel 24, shaft 12 and abrasive wheels 11.

The length of arc through which the abrasive wheels 11 may be oscillated can be varied by changing the eccentricity of the eccentric pin 29, and as shown in Figs. 1 and 3 this may be done by moving the head 37 of the pin 31 along the radial slot 38 in the eccentric hub 39, and securing the pin in the desired position by screwing down the clamping nuts 40.

The abrasive wheels 11 are beveled on the edges 41 to prevent the sharp corners from cutting the test piece 13. The circumference of the wheels between the beveled portions constitute the abrasive surface 19, shown in Fig. 2. This surface is formed by winding abrasive material 42, such as emery cloth, around the circumference of the wheels 11 and securing the ends 43 of the emery cloth in grooves 44 by the clamping rolls 45, or in any known manner.

The air for removing the loose particles from the rubbing surfaces of the abrasive wheels 11 and the test pieces 13 may be discharged from or drawn into the openings 17 of the boxes 18 by transmitting the air through conduits 46 controlled by valves 47 and connected to a common tank 48 in which may be produced an above normal, or sub-normal air pressure. One end of each conduit 46 is connected to the box 18 and is supported by an arm 49 which is pivoted on a hinge 50 having one wing secured to the arm 49 and the other wing secured to a support 51 forming a part of the frame of the machine. This end of the conduit is secured to the arm 49 by means of clamps 52, and is connected to the valve 47 by a flexible hose 53 so that the arm 49 and box 18 may be pivoted at the hinge 50 and turned from the position shown in Fig. 2 to the position shown in Fig. 5.

The test piece holder 14 comprises a main frame 54 having arms 55 pivoted on a pin 56 which passes through openings in the arms 55 and through brackets 57 secured to the frame of the machine. A holder sub-frame 58 is made in the form of a square enclosure and it fits against the corresponding enclosure on the main holder frame 54. A bolt 59 passes through each corner of the square enclosure in the main and sub-frames 54 and 58, respectively, and each of the bolts is provided with a wing nut 60. Preferably the test piece 13 of material is made in the shape as shown in Fig. 4, and is provided with four lateral wings 61 which are adapted to extend between the adjacent sides of the holder main and sub-frames 54 and 58.

In order to position the test piece 13 in the holder 14, the test piece holder is rotated from the position shown in Fig. 2 to the position shown in Fig. 5, where the holder 14 is supported by a block 62 and the wings 61 of the test piece are extended between the main and sub-frames 54 and 58. Weights 63 are attached to the wings 61 by clamps 64 for the purpose of placing the test piece 13 under the desired uniform tension in both a transverse and longitudinal direction. While the piece 13 is thus held under tension the wing nuts 60 are turned up so as to clamp the holder frames 54 and 58 together so as to tightly hold the test piece therebetween. The weights 63 are then taken off by removing the clamps 64.

When the test pieces 13 are thus clamped in position the holders 14 and the arms 49 carrying the air boxes 18 are rotated from the position shown in Fig. 5 to the position shown in Fig. 2, in which latter position the machine may be operated to carry out the test.

The number of oscillations made by the abrasive wheels 11 during any test is registered by a mechanical counter 65 operated through a lever 66 which in turn is operated by a cam 67 on the shaft which operates the eccentric hub 39.

It will be understood that the details of the embodiment of the invention described herein may be changed without departing from the spirit of the invention and the scope of the appended claims.

Having thus described our invention what we claim and desire to protect by Letters Patent is:

1. A textile material testing machine comprising an abrasive wheel mounted on a shaft substantially parallel to the surface of the material to be tested, said wheel having a cylindrical surface, means for holding the material to be tested in a stationary position and in contact with only a small arc of said cylindrical surface, means for oscillating said wheel about its axis, and means for rotating said wheel while it is being oscillated.

2. A textile material testing machine comprising an abrasive wheel mounted on a shaft substantially parallel to the surface of the material to be tested, said wheel having a cylindrical surface, means for holding the material to be tested in a stationary position under longitudinal and transverse tension and in contact with only a small arc of said cylindrical surface, means for oscillating said wheel about its axis, and means for rotating said wheel while it is being oscillated.

3. A material wear testing machine comprising an abrasive wheel, means for holding the material to be tested in a stationary position and in contact with only a portion of the circumference of said wheel, means for oscillating said wheel about its axis, means for adjusting the length of each oscillation, and means for rotating said wheel while it is being oscillated.

4. A material testing machine comprising an abrasive wheel, means for holding the material to be tested in a stationary position and in contact with only a portion of the circumference of said wheel, and means for oscillating and rotating said wheel simultaneously about its axis so as to rub said material and bring unused abrasive surfaces in contact with said material, said oscillating and rotating means comprising a worm wheel for operating said abrasive wheel, a worm meshing with said worm wheel, and means for simultaneously rotating and axially reciprocating said worm.

5. A material testing machine comprising a plurality of abrasive wheels mounted on a shaft, means for holding a piece of material to be tested in a stationary position and in contact with only a portion of the circumference of each abrasive wheel at any given instance, means for oscillating and continuously rotating said shaft simultaneously about its axis so as to rub said material and bring unused abrasive surfaces in contact with said material, said oscillating and rotating means comprising a worm wheel fixed to said shaft, a worm meshing with said worm wheel, and means for simultaneously rotating and axially reciprocating said worm.

HOWARD A. YOUNG.
JOHN C. H. WENDES.